(12) United States Patent
Saitou et al.

(10) Patent No.: US 7,866,189 B2
(45) Date of Patent: Jan. 11, 2011

(54) DEHYDRATION-SINTERING FURNACE, A MANUFACTURING METHOD OF AN OPTICAL FIBER PREFORM UTILIZING THE FURNACE AND AN OPTICAL FIBER PREFORM MANUFACTURED BY THE METHOD

(75) Inventors: Manabu Saitou, Chiba (JP); Naritoshi Yamada, Chiba (JP)

(73) Assignee: Fujikura Ltd., Tokyo (JP)

( * ) Notice: Subject to any disclaimer, the term of this patent is extended or adjusted under 35 U.S.C. 154(b) by 653 days.

(21) Appl. No.: 11/004,966

(22) Filed: Dec. 7, 2004

(65) Prior Publication Data
US 2005/0166640 A1 Aug. 4, 2005

(30) Foreign Application Priority Data
Dec. 8, 2003 (JP) .................... P2003-409068

(51) Int. Cl.
*C03B 37/075* (2006.01)
(52) U.S. Cl. .................. 65/488; 65/489; 65/530
(58) Field of Classification Search ............ 65/489, 65/530, 488, 379
See application file for complete search history.

(56) References Cited

U.S. PATENT DOCUMENTS

| | | | | |
|---|---|---|---|---|
| 3,933,457 A | * | 1/1976 | Scholes ............... | 65/60.7 |
| 4,172,976 A | * | 10/1979 | Namiki et al. .......... | 219/469 |
| 4,301,138 A | * | 11/1981 | Ryan et al. ............ | 423/495 |
| 4,594,089 A | * | 6/1986 | Kurata ............... | 65/135.8 |
| 4,608,070 A | * | 8/1986 | Roba ................ | 65/420 |
| 4,969,941 A | * | 11/1990 | Kyoto et al. .......... | 65/391 |
| 4,995,892 A | * | 2/1991 | Garrett et al. ......... | 65/379 |
| 5,222,769 A | * | 6/1993 | Kaempen ............. | 285/45 |
| 5,470,369 A | * | 11/1995 | Tsuchiya et al. ....... | 65/379 |
| 5,713,979 A | * | 2/1998 | Nicholson et al. ...... | 65/424 |
| 5,896,297 A | * | 4/1999 | Valerino, Sr. ......... | 700/213 |
| 5,897,682 A | * | 4/1999 | Koaizawa et al. ...... | 65/489 |
| 7,261,763 B2 | * | 8/2007 | Shirley .............. | 95/45 |
| 2003/0079502 A1 | * | 5/2003 | Dawes et al. ......... | 65/397 |

FOREIGN PATENT DOCUMENTS

| JP | 01159636 | * | 6/1989 |
|---|---|---|---|
| JP | 402212325 A | * | 8/1990 |
| JP | 05/004828 A | | 1/1993 |
| JP | H06-127964 A | | 5/1994 |
| JP | H06-50513 A | | 12/1994 |
| JP | H10-120428 A | | 5/1998 |

* cited by examiner

*Primary Examiner*—John Hoffmann
(74) *Attorney, Agent, or Firm*—Sughrue Mion, PLLC

(57) ABSTRACT

A dehydration-sintering furnace for dehydrating and/or sintering an optical fiber preform for use in production of an optical fiber includes a muffle for accommodating the optical fiber preform, a heater for heating the muffle, and a pressure fluctuation absorbing apparatus connected to the muffle. Since the pressure fluctuation absorbing apparatus is thermally insulated from a room temperature atmosphere or heated, vapor produced in a dehydration-sintering process is prevented from condensing (liquefying) in a pressure fluctuation absorbing apparatus, thereby preventing reduced dehydration effectiveness in the muffle and reduced quality of the optical fiber preform.

9 Claims, 6 Drawing Sheets

DEHYDRATION-SINTERING FURNACE, A MANUFACTURING METHOD OF AN OPTICAL FIBER PREFORM UTILIZING THE FURNACE AND AN OPTICAL FIBER PREFORM MANUFACTURED BY THE METHOD

CROSS REFERENCE TO RELATED APPLICATION

This application claims the benefit of priority under 35 U.S.C. §119 to Japanese Patent Application No. 2003-409068, the entire contents of which are incorporated by reference herein.

BACKGROUND OF THE INVENTION

1. Field of the Invention

The present invention relates to a dehydration-sintering furnace, more particularly, a dehydration-sintering furnace for use in a dehydration and/or a sinter process of a porous optical fiber (glass fiber) preform.

2. Description of the Related Art

A porous optical fiber preform produced by Vapor Phase Axial Deposition (VAD) method, Outside Vapor Deposition (OVD) method and the like is dehydrated and/or sintered by accommodating the preform in a muffle of a dehydration-sintering furnace, supplying to the muffle dehydration agents such as chlorine, thionyl chloride or the like and an inert gas such as helium or the like, and then heating the muffle with a heater.

An example of a dehydration-sintering furnace for dehydrating and/or sintering the porous optical fiber preform is a furnace that has a muffle connected to a pressure fluctuation absorbing apparatus such as a balloon type pressure buffer, a gas-flow buffering chamber, or a pressure fluctuation absorption chamber utilizing an electro magneto valve and the like in order to suppress a rather large pressure fluctuation and swiftly keep the muffle pressure constant (Refer to, for example, Publication of Examined Utility Model Application H06-50513 and Japanese Patent Application Laid-open Publications H05-4828, H06-127964, and H10-120428).

While the pressure fluctuation absorbing apparatus connected to the muffle is advantageous in absorbing a short-term pressure fluctuation in the muffle, the absorbing apparatus is somewhat disadvantageous as described below.

When the pressure in the muffle is raised, the gas therein is pressed out into the pressure fluctuation absorbing apparatus from the muffle. On the other hand, when the pressure is lowered, the gas in the pressure fluctuation absorbing apparatus flows back to the muffle.

Since the pressure fluctuation absorbing apparatus is positioned outside of the furnace and exposed to a room temperature atmosphere, vapor that includes substances produced during a dehydration and/or sinter process is condensed (liquefied) in the pressure fluctuation absorbing apparatus. The larger amount of moisture exists in the porous optic fiber preform, the larger amount of condensation takes place.

The liquid produced by condensation (liquefaction) in the pressure fluctuation absorbing apparatus will flow back to the muffle when the pressure in the furnace decreases, thereby deteriorating the dehydration effectiveness in the muffle.

In addition, the liquid condensed in the pressure fluctuation absorbing apparatus may drop on the porous optical fiber preform and then taint the surface of the preform. Also, the dropped liquid may make brittle the portion of soot on which the liquid drops and then the portion may fall apart therefrom. Those will deteriorate the quality of the optical fiber preform and reduce the production yield of the same.

Also, when the liquid condensed in the pressure fluctuation absorbing apparatus does not flow back to the muffle but stays at a duct and the like connecting the muffle and the pressure fluctuation absorbing apparatus, since substances produced in the dehydration process contain strong acids such as hydrogen chloride and sulfuric acid, the duct and the like will be eroded, thereby shortening an operating life of the furnace.

The objective of the present invention is to provide a dehydration-sintering furnace having a pressure fluctuation absorbing apparatus, wherein vapor that contains substances produced in the dehydration and/or sinter process is prevented from condensing in the pressure fluctuation absorbing apparatus and thereby the flowing of condensed liquid back to the muffle of the dehydration-sintering furnace is essentially prevented.

Another objective of the present invention is to provide a manufacturing method of optical fiber preform, utilizing the above dehydration-sintering furnace, the method enabling a stable production of a high quality optical fiber preform.

SUMMARY OF THE INVENTION

A first aspect of the present invention provides a dehydration-sintering furnace having a muffle for dehydrating and/or sintering an optical fiber preform for use in production of an optical fiber, wherein a pressure fluctuation absorbing apparatus is connected to said muffle and said pressure fluctuation absorbing apparatus is covered with a thermally insulating material.

A second aspect of the present invention provides a dehydration-sintering furnace having a muffle for dehydrating and/or sintering an optical fiber preform for use in production of an optical fiber, wherein a pressure fluctuation absorbing apparatus is connected to said muffle and said pressure fluctuation absorbing apparatus is accommodated in a thermally insulated container.

A third aspect of the present invention provides a dehydration-sintering furnace having a muffle for dehydrating and/or sintering an optical fiber preform for use in production of an optical fiber, wherein a pressure fluctuation absorbing apparatus is connected to said muffle and said furnace is provided with heating means configured to heat said pressure fluctuation absorbing apparatus.

A fourth aspect of the present invention provides a manufacturing method of an optical fiber preform, utilizing any of said dehydration-sintering furnaces, wherein a gas temperature is at 100 degrees Celsius or higher in said pressure fluctuation absorbing apparatus.

The dehydration-sintering furnace according to the present invention is capable of preventing vapor produced in a dehydration-sintering process from condensing (liquefying) in a pressure fluctuation absorbing apparatus since the pressure fluctuation absorbing apparatus is thermally insulated from a room temperature atmosphere or heated.

Since the above structure is able to essentially prevent the liquid condensed in the pressure fluctuation absorbing apparatus from flowing back to the muffle and/or dropping on the optical fiber preform accommodated in the muffle, a dehydration effectiveness in the muffle and a quality of the optical fiber preform are not deteriorated, thereby enabling a stable production of an optical fiber preform.

DESCRIPTION OF THE PREFERRED EMBODIMENTS

A First Embodiment

Figure 1:
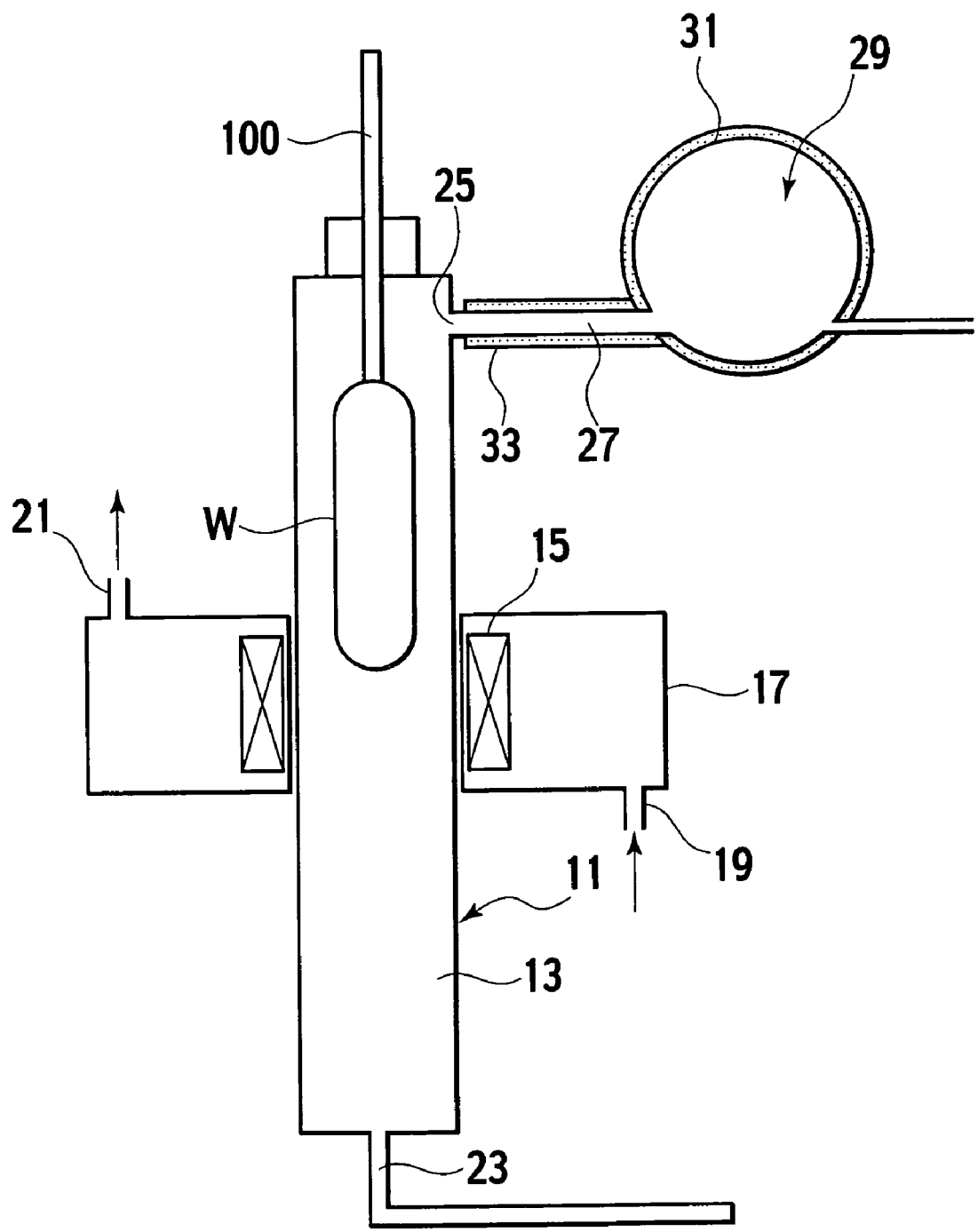
FIG. 1 is an illustration of a dehydration-sintering furnace according to a first embodiment of the present invention.

Referring to FIG. 1, a hydration-sintering furnace according to a first embodiment of the present invention will be described in the following. The hydration-sintering furnace in FIG. 1 has a quartz-made, hermetically constructed muffle 11 as the furnace main body. The muffle 11 accommodates a porous optical fiber preform W so as to suspend the preform W with a seed rod 100 in the interior 13 of the muffle 11.

Outside of the muffle 11 is provided a furnace body 17 in which a heater 15 for heating the interior 13, that is, the optical fiber preform W in the interior 13 is provided. An inert gas such as helium, argon and the like as a purge gas is supplied from a purge gas inlet 19 into the furnace body 17. The purge gas supplied into the furnace body 17 is discharged out from an outlet 21.

The muffle 11 has at the bottom thereof a gas inlet tube 23 that allows dehydration agents such as chlorine gas, thionyl chloride or the like and inert gas such as helium or the like to be supplied from a gas supplier (not shown) into the interior 13.

In addition, the muffle 11 has at the top thereof a pressure adjustment port 25. To the pressure adjustment port 25, a pressure fluctuation absorbing apparatus 29 is connected via a duct 27. The pressure fluctuation absorbing apparatus 29 can be a well-known one such as a balloon type pressure buffer, a gas-flow buffer chamber, or a pressure fluctuation absorption chamber utilizing an electro magneto valve and the like, about which a detailed explanation is eliminated.

The pressure fluctuation absorbing apparatus 29 is covered and thermally insulated with a thermally insulating material 31. Also, the duct 27 connecting the muffle 11 and the pressure fluctuation absorbing apparatus 29 is covered with a thermally insulating material 33 to thermally insulate the duct 27.

The thermally insulating materials 31, 33 are formed of fibrous insulation material, such as an alumina fiber, having high heat resisting properties and totally cover the pressure fluctuation absorbing apparatus 29 and the duct 27 for thermal insulation.

In the dehydration-sintering furnace having the above structure, the optical fiber preform W is dehydrated and/or sintered in the interior 13 by heating the muffle 11 with the heater 15.

When the pressure in the interior 13 is raised during a dehydration and sinter process, the gas in the interior 13 is pressed out into the pressure fluctuation absorbing apparatus 29 via the duct 27, while the gas in the pressure fluctuation absorbing apparatus 29 flows back to the muffle 11 via the duct 27 when the pressure in the interior 13 is lowered, thereby suppressing the pressure fluctuation in the interior 13.

The gas flow between the interior 13 and the pressure fluctuation absorbing apparatus 29 contains vapor that contains moisture emerging from the optical fiber preform W in the interior 13 and substances produced in the dehydration and sinter process. Since the pressure fluctuation absorbing apparatus 29 and the duct 27 are insulated from a room temperature atmosphere with the thermally insulating materials 31, 33, such vapor is prevented from condensing in the pressure fluctuation absorbing apparatus 29 and the duct 27.

Therefore, no liquid is produced by condensation in the pressure 29 and the duct 27, thereby essentially preventing the flowing of any liquid by condensation back to the muffle 11. This is how a reduction in dehydration effectiveness and a phenomenon such as the liquid by condensation dropping on the optical fiber preform W are prevented, thereby enabling a stable production of a high quality optical fiber preform.

Optical fibers manufactured by drawing the optical fiber preform that has been dehydrated and sintered in the dehydration-sintering furnace having a pressure fluctuation absorbing apparatus 29 covered with a thermally insulating material show an average transmission loss of as low as about 0.286 dB/km at a wavelength of 1385 nm. For comparison, other optical fibers are manufactured under the same conditions but a use of a dehydration-sintering furnace having a pressure fluctuation absorbing apparatus with no thermally insulating material covered. As a result, the optical fibers for comparison show an average transmission loss of about 0.292 dB/km at a wavelength of 1385 nm. From this comparison, it is understood that the dehydration-sintering furnace according to this embodiment and a manufacturing method of an optical fiber preform utilizing the same exert a superior operational effect.

In addition, since any liquid by condensation in the pressure fluctuation absorbing apparatus 29 does not flow back to the muffle 11 or stay in the duct 27, the duct 27 is prevented from erosion in a short term by strong acids such as hydrogen chloride and sulfuric acid, thereby lengthening the life of the furnace.

A Second Embodiment

Figure 2:
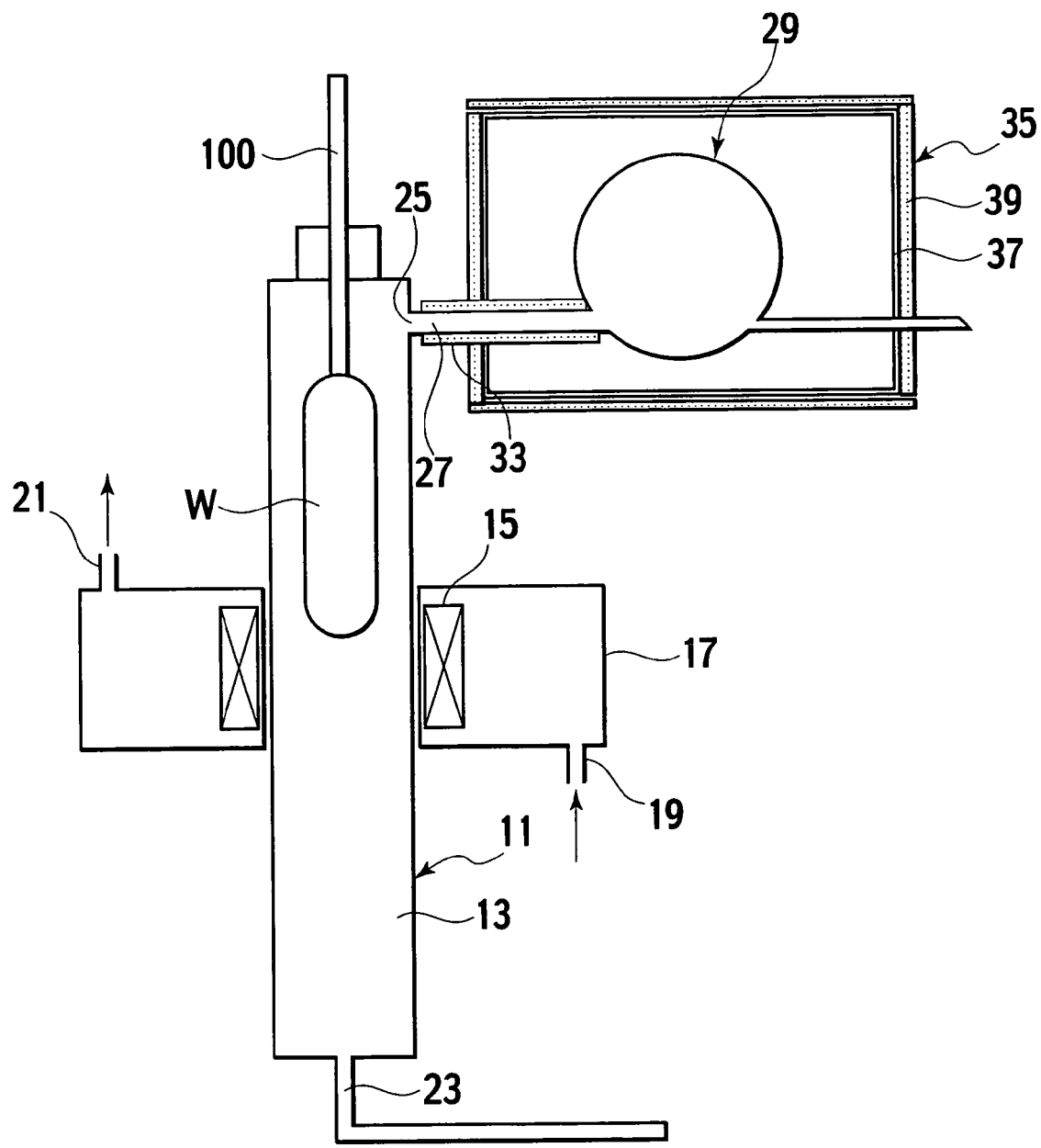
FIG. 2 is an illustration of a dehydration-sintering furnace according to a second embodiment of the present invention.

Referring to FIG. 2, a dehydration-sintering furnace according to a second embodiment of the present invention will be described. In FIG. 2, a member or component corresponding to that in FIG. 1 will be represented by a same reference mark used in FIG. 1 to eliminate an undue repetition of explanation.

In the second embodiment, a pressure fluctuation absorbing apparatus 29 is totally housed in a hermetically constructed, thermally insulated container 35. The container 35 is composed of a hermetic box 37 and a thermally insulating material 39, such as an alumina fiber and the like, which covers the hermetic box 37 to thermally insulate substantially the entire box 37.

In this embodiment, the pressure fluctuation absorbing apparatus 29 and a duct 27 are thermally insulated from a room temperature atmosphere by the hermetic box 37 and the thermally insulating material 33, thereby preventing vapor that contains substances produced in a dehydration-sintering process from condensing (liquefying) in the pressure fluctuation absorbing apparatus 29 and the duct 27.

Therefore, since any liquid by condensation is not produced in the pressure fluctuation absorbing apparatus 29 and the duct 27, any liquid by condensation does not flow back to the muffle 11, thereby essentially preventing the flowing of condensed liquid back to the muffle 11 and enabling a stable production of a high quality optical fiber preform.

A Third Embodiment

Figure 3:
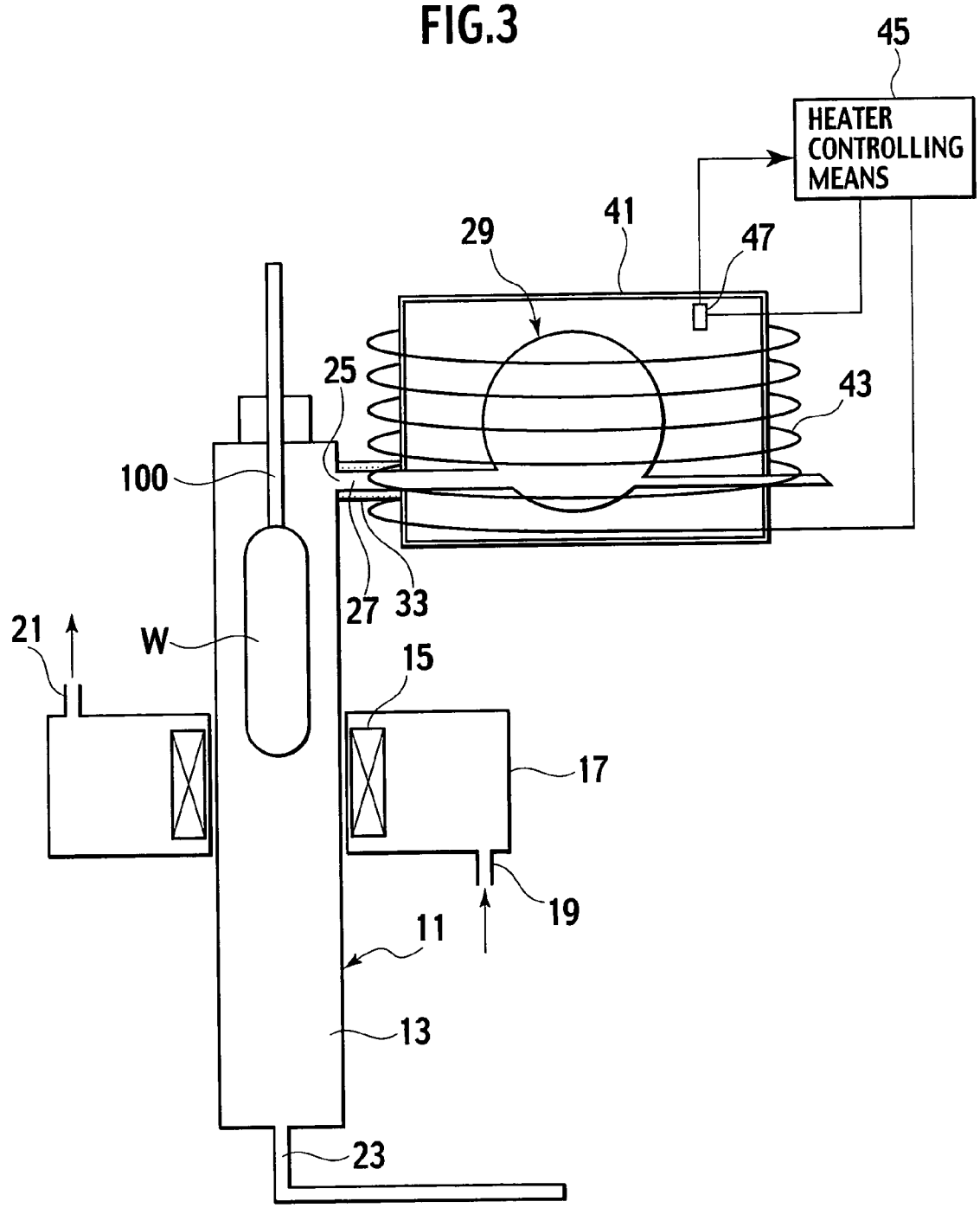
FIG. 3 is an illustration of a dehydration-sintering furnace according to a third embodiment of the present invention.

Referring to FIG. 3, a dehydration-sintering furnace according to a third embodiment of the present invention will be described. Also in FIG. 3, a member or component corresponding to that in FIG. 1 will be represented by a same reference mark used in FIG. 1 to eliminate an undue repetition of explanation.

In the third embodiment, a pressure fluctuation absorbing apparatus 29 is housed in a container 41. Outside of the container 41, a heater 43 is provided as a heating means surrounding the container 41. Electric power supplied to the heater 43 is regulated by a heater controlling means 45, which controls the heating value from the heater 43 to heat the container 41. In this way, the temperature inside the container 41 is raised and the pressure fluctuation absorbing apparatus 29 is heated indirectly with the heater 43.

The container 41 has a temperature sensor 47 therein that detects a temperature inside the container 41. The heater controlling means 45 inputs a signal from the temperature sensor 47 and accordingly regulates electric power to be supplied to the heater 43 in order to keep the temperature inside the container 41 at a predetermined temperature (a constant temperature) needed to avoid condensation.

With the above construction, the pressure fluctuation absorbing apparatus 29 is kept at a temperature equal to or higher than the temperature needed to avoid condensation, thereby preventing a generation of liquid by condensation in the pressure fluctuation absorbing apparatus 29. Therefore, the flowing of condensed liquid back to the muffle 11 is essentially prevented, thereby enabling a stable production of a high quality optical fiber preform.

Incidentally, the pressure fluctuation absorbing apparatus 29 may be constructed such that the apparatus 29 is directly heated by the heater 43. This construction also demonstrates the same operational advantages as the foregoing construction in this embodiment. Also, an additional heater can be provided for the duct 27.

A Fourth Embodiment

Figure 4:
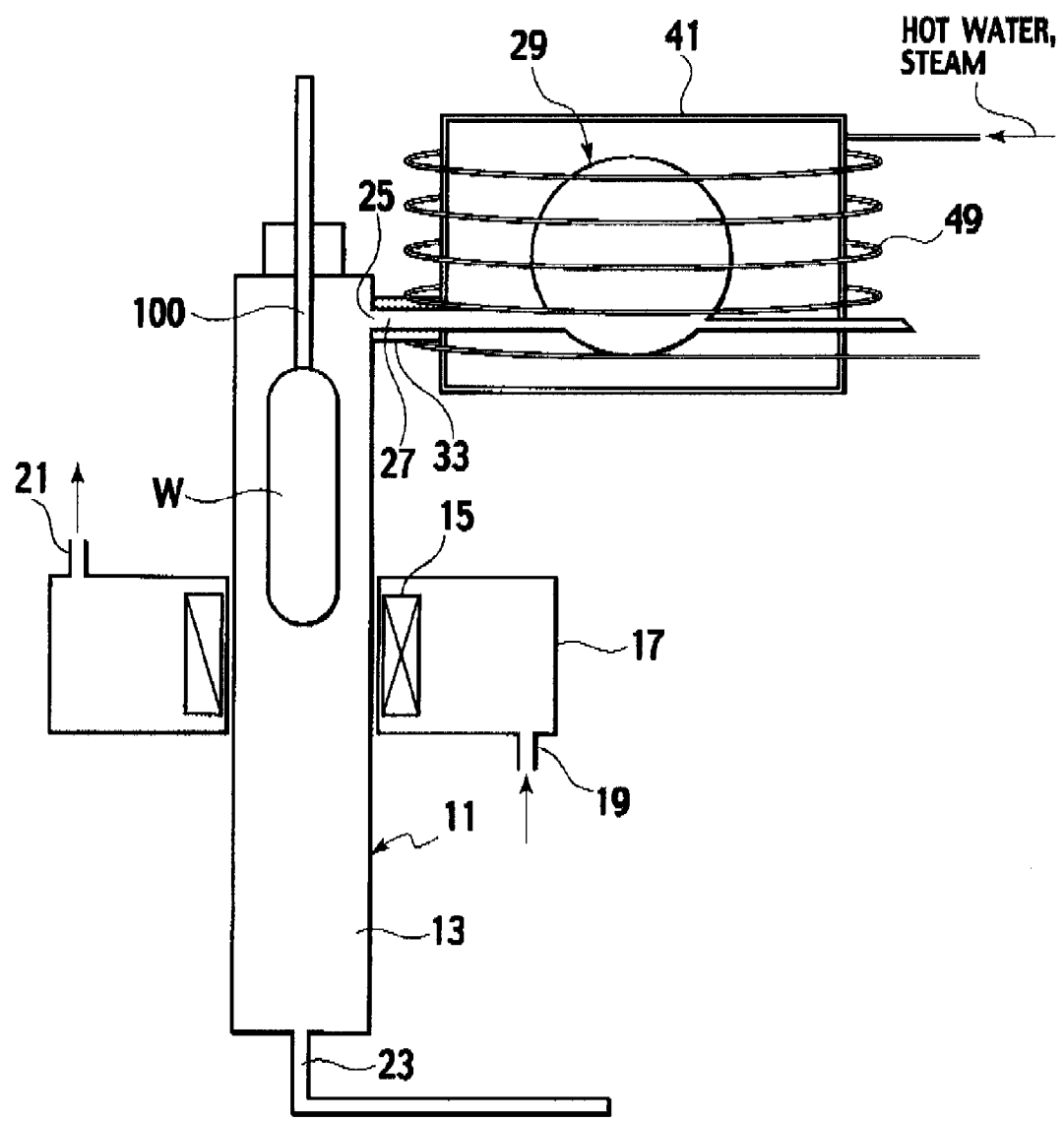
FIG. 4 is an illustration of a dehydration-sintering furnace according to a fourth embodiment of the present invention.

Referring to FIG. 4, a dehydration-sintering furnace according to a fourth embodiment of the present invention will be described. In FIG. 4, a member or component corresponding to that in FIG. 3 will be represented by a same reference mark used in FIG. 3 to eliminate an undue repetition of explanation.

In the fourth embodiment, a heat exchanger 49 as a heating means is provided so as to surround the outside of the container 41. The heat exchanger 49 has a heat transfer medium such as hot water, steam, and the like flowing therein.

With this construction, the container 41 is heated and then the temperature inside the container 41 is raised, thereby heating indirectly the pressure fluctuation absorbing apparatus 29 by the heat exchanger 49.

Accordingly, the pressure fluctuation absorbing apparatus 29 is kept at a temperature equal to or higher than the temperature needed to avoid condensation, thereby preventing liquid by condensation from being produced in the pressure fluctuation absorbing apparatus 29. Therefore, the flowing of liquid by condensation back to the muffle 11 is essentially prevented, thereby enabling a stable production of a high quality optical fiber preform.

Incidentally, the pressure fluctuation absorbing apparatus 29 may be constructed such that the apparatus 29 is directly heated by the heat exchanger 49, which is capable of demonstrating the same operational advantages as the above-mentioned construction in this embodiment. In addition, the heat transfer medium supplied to the heat exchanger 49 can be a hot purge gas exhausted from the furnace body 17. Furthermore, an additional heat exchanger can be provided for the duct 27.

A Fifth Embodiment

Figure 5:
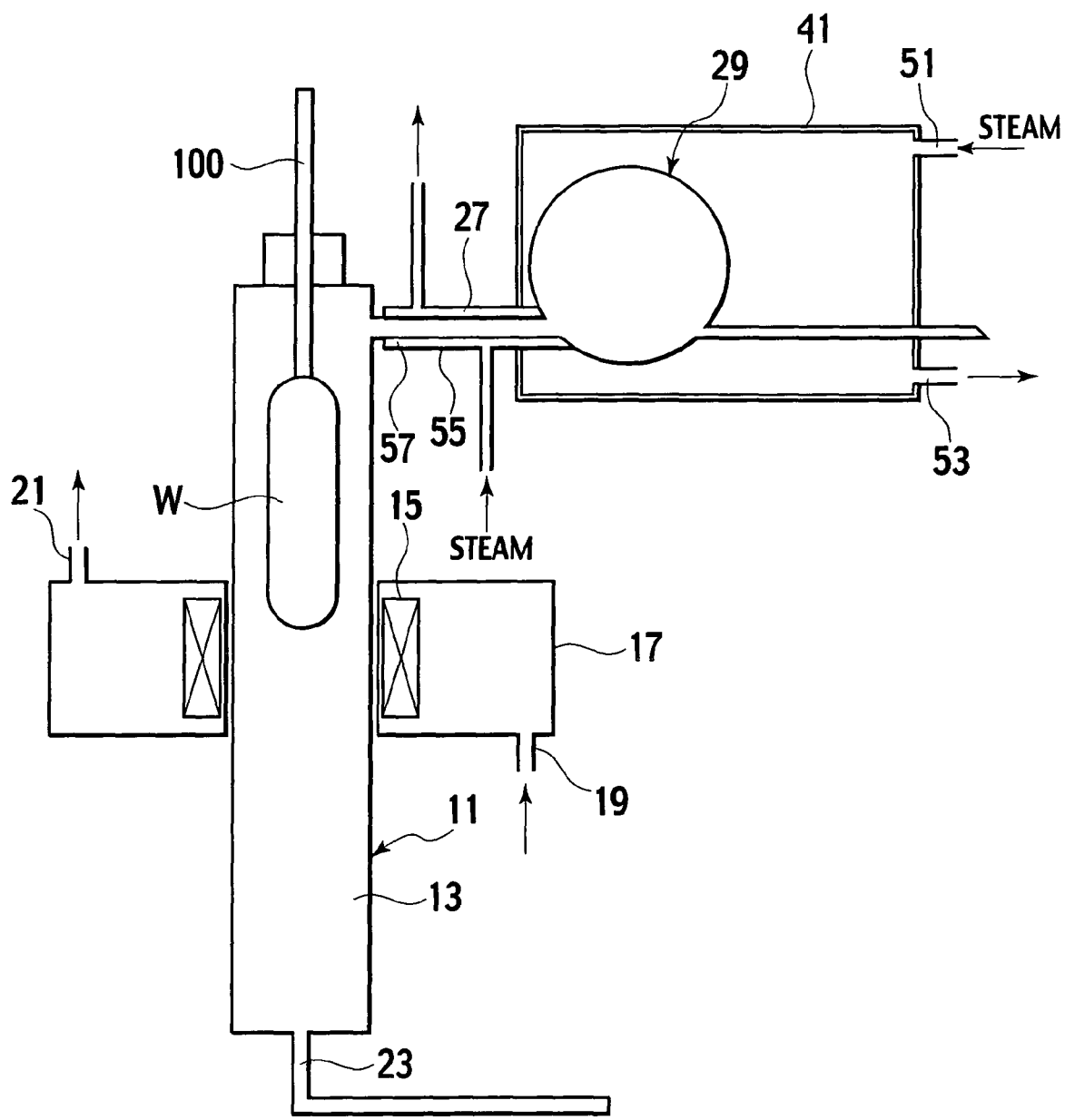
FIG. 5 is an illustration of a dehydration-sintering furnace according to a fifth embodiment of the present invention.

Referring to FIG. 5, a dehydration-sintering furnace according to a fifth embodiment of the present invention will be described. In the fifth embodiment, a container 41 has an inlet 51 and an outlet 53, through which a heat transfer medium such as steam is supplied to the container 41. With this construction, the interior of the container 41 is heated so that the temperature thereof is raised, thereby heating the pressure fluctuation absorbing apparatus 29.

Accordingly, the pressure fluctuation absorbing apparatus 29 is kept at a temperature equal to or higher than the temperature needed to avoid condensation, thereby preventing liquid by condensation from being produced in the pressure fluctuation absorbing apparatus 29. Therefore, the flowing of liquid by condensation back to the muffle 11 is essentially prevented, thereby enabling a stable production of a high quality optical fiber preform.

In addition, the duct 27 connecting the muffle 11 and the pressure fluctuation absorbing apparatus 29 may be coaxially surrounded by an outer pipe 55 to form a double tube. The heat transfer medium such as steam is also supplied to pass through a path 57 between the duct 27 and the outer pipe 55, thereby heating the duct 27. The heat transfer medium flowing through the duct keeps a temperature of the duct equal to or higher than the temperature needed to prevent condensation, thereby preventing liquid by condensation from being produced in the duct. By the way, the heat transfer medium supplied to the container 41 and the path 57 can just as readily be hot water instead of steam.

A Sixth Embodiment

Figure 6:
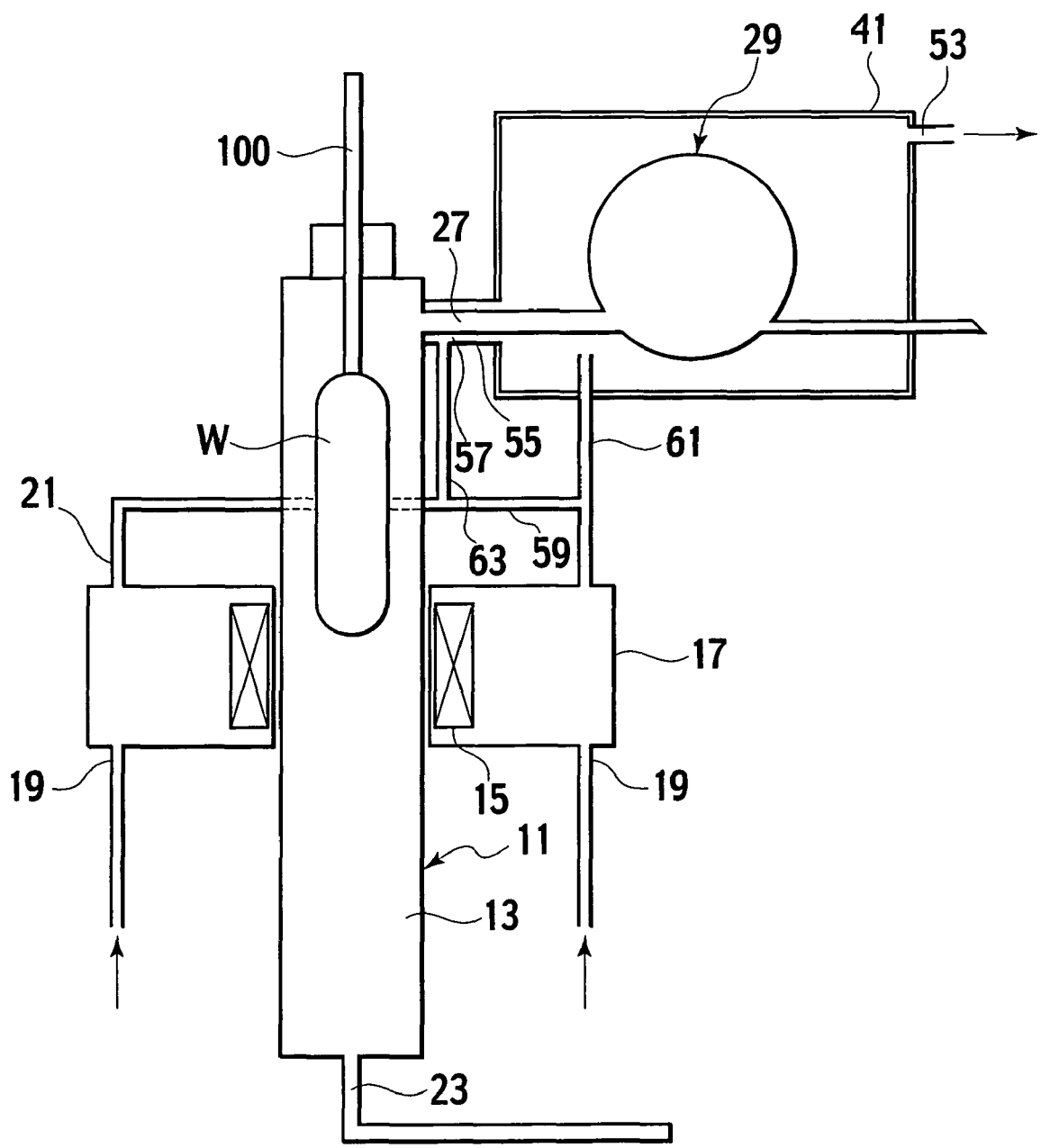
FIG. 6 is an illustration of a dehydration-sintering furnace according to a sixth embodiment of the present invention.

Referring to FIG. 6, a dehydration-sintering furnace according to a sixth embodiment of the present invention will be described. In the sixth embodiment, a container 41 and a path 57 are connected to a gas purge discharge port 21 of a furnace body 17 via ducts 59, 61, 63. With this construction, the purge gas discharged from the furnace body 17 is supplied to the container 41 and the path 57 as a heat transfer medium, thereby raising the temperature inside the container 41 and the path 57, and then also raising the temperature of the pressure fluctuation absorbing apparatus 29 and the duct 27.

Therefore, the pressure fluctuation absorbing apparatus 29 and the duct 27 are kept at a temperature equal to or higher than the temperature needed to avoid condensation, thereby preventing liquid by condensation from being produced in the pressure fluctuation absorbing apparatus 29 and the duct 27. Therefore, the flowing of liquid by condensation back to the muffle 11 is essentially prevented, thereby enabling a stable production of a high quality optical fiber preform.

The gas temperature inside the pressure fluctuation absorbing apparatus 29 may be kept at 100 degrees Celsius or higher, or may be kept at 300 degrees Celsius or higher. When the temperature is 100 degrees Celsius or higher, moisture in the gas does not condense. When the temperature is 300 degrees Celsius or higher, even if the dehydration agents contain sulfur atoms and oxygen atoms and then sulfuric acid or sulfuric acid gas is produced by dehydration reaction, sulfuric acid does not condense in the pressure fluctuation absorbing apparatus 29, thereby enabling a stable production of a high quality optical fiber preform.

Although the above exemplary embodiments of the present invention have been described, it will be understood by those skilled in the art that the present invention should not be limited to the described exemplary embodiments, but that various changes and modifications can be made within the spirit and scope of the present invention.

What is claimed is:

1. A dehydration-sintering furnace for an optical fiber preform comprising:
    a cylindrical muffle configured to house the optical fiber preform;
    a heater arranged around a periphery of the muffle and configured to heat the muffle for dehydrating or sintering the optical fiber preform;
    a pressure fluctuation absorbing apparatus to suppress fluctuations of a gas pressure in the muffle;
    a duct connected to an upper portion of the muffle, the duct connected between the muffle and the pressure fluctuation absorbing apparatus to allow a gas flow from the muffle to the pressure fluctuation absorbing apparatus or vise versa;
    an outer pipe coaxially surrounding the duct so as to form a double tube, thereby allowing heat transfer medium to be present between said duct and said outer pipe to heat said duct; and
    a container configured to house the pressure fluctuation absorbing apparatus, and the container has an inlet and an outlet to supply the heat transfer medium to said container to heat said pressure fluctuation absorbing apparatus,
    wherein the container and the double tube are configured to maintain vapor in the pressure fluctuation absorbing apparatus and the duct at 100 degrees Celsius or higher, the vapor containing substances produced in the dehydration and sintering process.

2. A dehydration-sintering furnace according to claim 1, wherein said muffle is made of quartz and hermetically constructed.

3. A dehydration-sintering furnace according to claim 1, further comprising a tube connected to a lower portion of the muffle to supply dehydration agent to the muffle.

4. A dehydration-sintering furnace according to claim 1, wherein said muffle is made of quartz, and hermetically constructed.

5. A dehydration sintering furnace according to claim 1, wherein said pressure fluctuation absorbing apparatus is selected from the group consisting of a balloon type pressure buffer, a gas-flow pressure buffer chamber, and a pressure fluctuation absorption chamber having an electromagnetic valve, wherein the balloon-type pressure buffer has a balloon connected to the duct, the balloon changing in volume depending on a pressure in the muffle.

6. A dehydration-sintering furnace for an optical fiber preform comprising:
    a cylindrical muffle configured to house the optical fiber preform;
    a heater arranged around a periphery of the muffle and configured to heat the muffle for dehydrating or sintering the optical fiber preform;
    a pressure fluctuation absorbing apparatus to suppress fluctuations of a gas pressure in the muffle;
    a first duct connected to an upper portion of the muffle, the first duct connected between the muffle and pressure fluctuation absorbing apparatus to allow a gas flow from the muffle to the pressure fluctuation absorbing apparatus or vise versa;
    a furnace body that houses the heater for heating said muffle, the furnace body has an inlet, to supply heat transfer medium to be heated by the heater;
    an outer pipe coaxially surrounding the duct so as to form a double tube, thereby allowing the heat transfer medium to be present between said duct and said outer pipe to heat said duct;
    a container configured to house the pressure fluctuation absorbing apparatus, and the container has an outlet to discharge the heat transfer medium; and
    a second duct connecting the furnace body to the container and the outer pipe, to supply the heat transfer medium discharged by the container and to between the second duct and the outer pipe to heat said pressure fluctuation absorbing apparatus;
    wherein the container and the double tube keep vapor in the pressure fluctuation absorbing apparatus and the duct at 100 degrees Celsius or higher by supply of the heat transfer medium, the vapor containing substances produced in the dehydration and sinter process.

7. A dehydration-sintering furnace according to claim 6, further comprising a tube connected to a lower portion of the muffle to supply dehydration agent to the muffle.

8. A dehydration sintering furnace according to claim 6, wherein said muffle is made of quartz, and hermetically constructed.

9. A dehydration sintering furnace according to claim 6, wherein said pressure fluctuation absorbing apparatus is selected from the group consisting of a balloon type pressure buffer, a gas-flow pressure buffer chamber, and a pressure fluctuation absorption chamber having an electromagnetic valve, wherein the balloon-type pressure buffer has a balloon connected to the duct, the balloon changing in volume depending on a pressure in the muffle.

* * * * *